United States Patent
Yamasaki

(10) Patent No.: US 12,407,785 B2
(45) Date of Patent: Sep. 2, 2025

(54) PRINT DATA CORRECTION METHOD, STORAGE MEDIUM, AND PRINTING DEVICE

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 206 days.

(21) Appl. No.: 18/110,652

(22) Filed: Feb. 16, 2023

(65) Prior Publication Data

US 2023/0269332 A1    Aug. 24, 2023

(30) Foreign Application Priority Data

Feb. 18, 2022  (JP) ................. 2022-023410

(51) Int. Cl.
| | | |
|---|---|---|
| *H04N 1/00* | (2006.01) | |
| *B41J 2/14* | (2006.01) | |
| *B41J 29/26* | (2006.01) | |

(52) U.S. Cl.
CPC ............ *H04N 1/00045* (2013.01); *B41J 2/14* (2013.01); *B41J 29/26* (2013.01)

(58) Field of Classification Search
CPC ......... H04N 1/00045; B41J 2/14; B41J 29/26; B41J 2/2132; B41J 2/2139; B41J 2/2142; B41J 29/393; B41F 33/0027; B41F 33/0009; B41F 33/0036
See application file for complete search history.

(56) References Cited

U.S. PATENT DOCUMENTS

2008/0130061 A1* 6/2008 Nakase .............. H04N 1/00045
                                                                358/406

FOREIGN PATENT DOCUMENTS

| JP | 2005-178043 A | 7/2005 |
| JP | 2009-000836 A | 1/2009 |

OTHER PUBLICATIONS

JPO; Application No. 2022-023410; Notice of Reasons for Refusal dated Sep. 12, 2023.

* cited by examiner

*Primary Examiner* — Bradley W Thies
(74) *Attorney, Agent, or Firm* — Fitch, Even, Tabin & Flannery LLP

(57) ABSTRACT

Provided is a print data correction method that is executed by a printing device. The print data correction method includes: printing a first correction chart with a printer that performs printing; obtaining a first correction value based on the printed first correction chart; printing a second correction chart based on the first correction value with the printer; obtaining a second correction value based on the printed second correction chart; and correcting, based on the second correction value, print data to be printed by the printer.

10 Claims, 11 Drawing Sheets

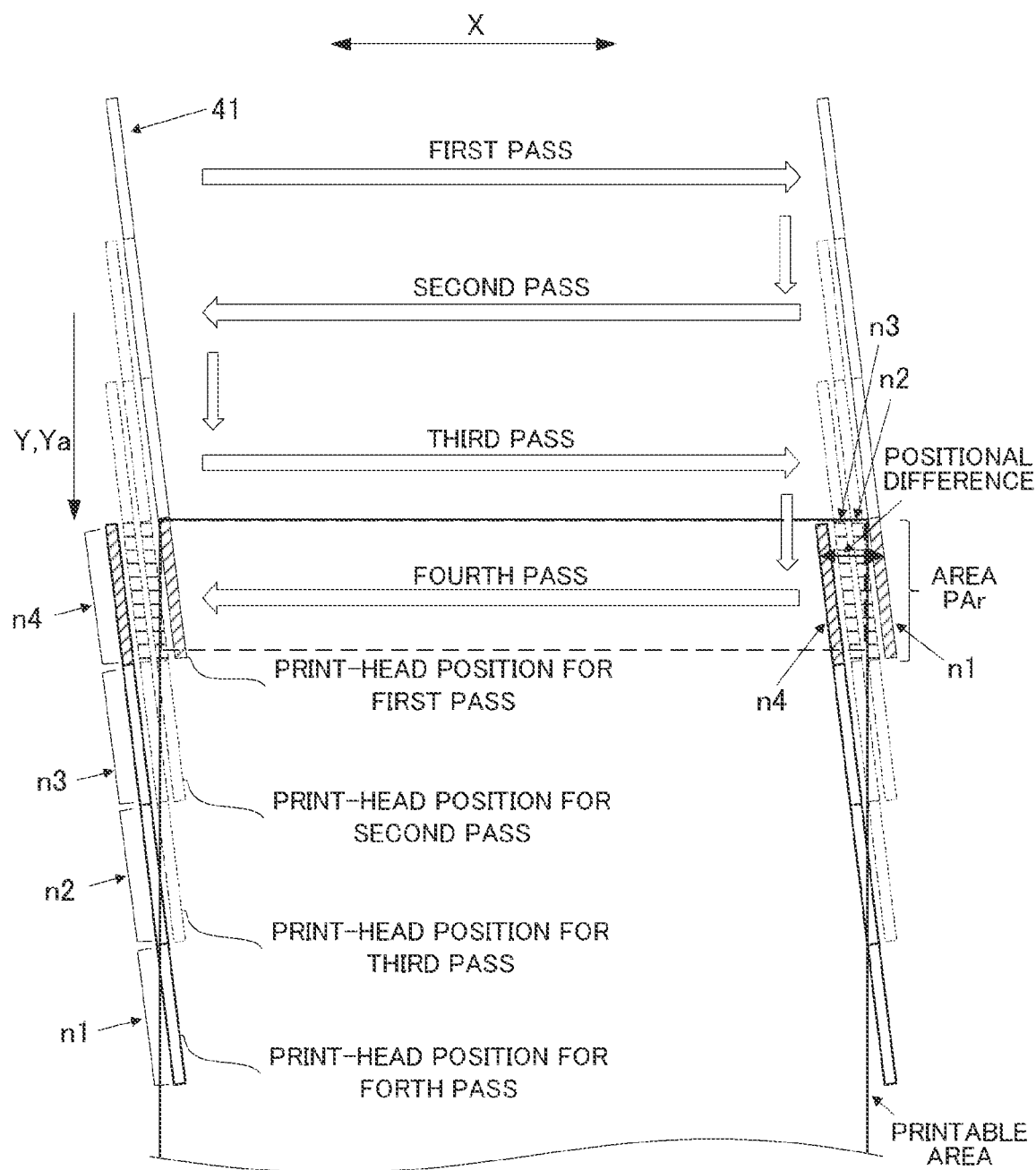

FIG.8A PATTERN A
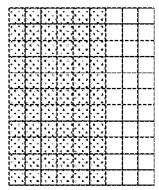
FIG.8B BLOCK A
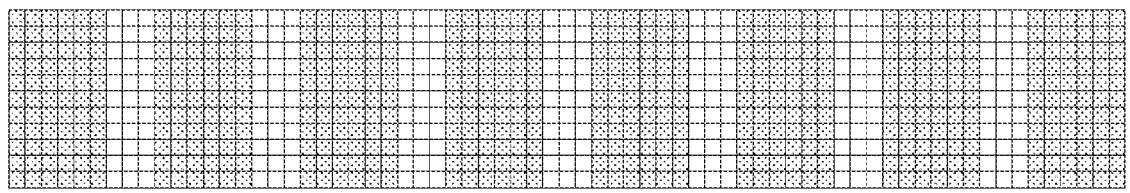
FIG.9A PATTERN B
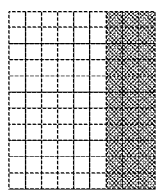
FIG.9B BLOCK B
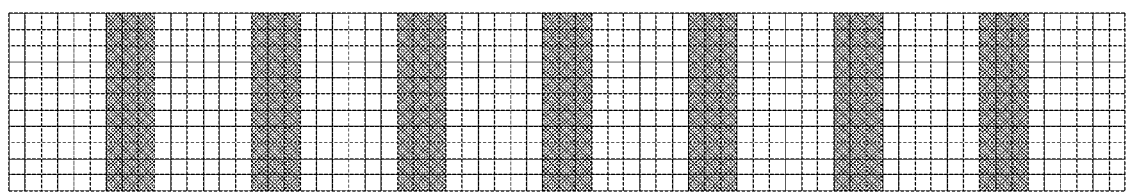
FIG.10A
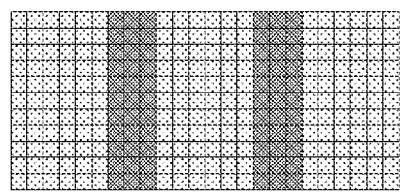
FIG.10B
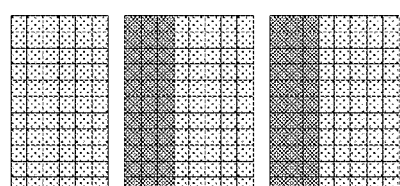

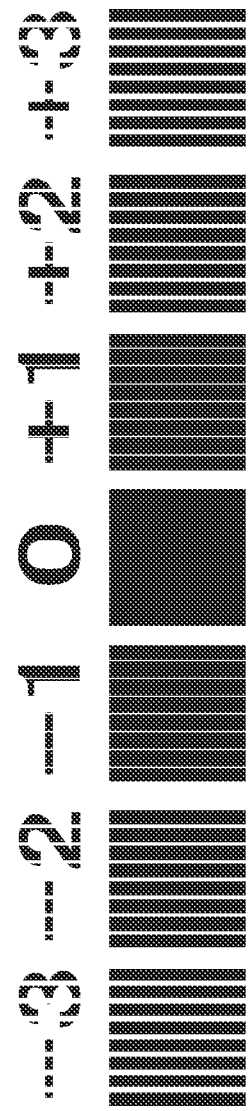

PATTERN C

12 PIXELS  6 PIXELS

BLOCK C

PATTERN D

12 PIXELS  6 PIXELS

BLOCK D

4 PIXELS

PRINT DATA CORRECTION METHOD, STORAGE MEDIUM, AND PRINTING DEVICE

REFERENCE TO RELATED APPLICATIONS

This application is based upon and claims the benefit of priority from Japanese Patent Application No. 2022-023410 filed on Feb. 18, 2022, the entire content of which is incorporated herein by reference.

TECHNICAL FIELD

The present disclosure relates to a print data correction method, a storage medium, and a printing device.

DESCRIPTION OF RELATED ART

There has been known a printing device (nail printing device) that prints a design on the nail of a finger or the like. This type of printing device performs a printing process using an inkjet print head, for example.

Although the normal installation state of the print head is a state in which the print head is movable in a direction perpendicular to the left-right direction (main-scanning direction) with respect to the front of the printing device, the print head may be inclined from this normal installation state due to errors in designing or assembling, external shocks, or the like.

If the print head performs printing in the state of being inclined, ink landing positions deviate from their originally planned positions, so that high-quality printing results cannot be obtained.

In particular, in a case where the print head performs printing by a multi-pass method, by which printing on each area is performed by multiple passes, images printed by respective passes have positional difference, so that decrease in quality of printing is significant.

In this regard, for example, in JP 2009-000836 A, there is disclosed a recording (printing) method of recording (printing) a test pattern for detecting the amount of inclination of nozzle groups of a print head (recording head), and selecting a mask pattern corresponding to the detected amount of inclination to reduce the number of dots formed by ink ejected from nozzles greatly inclined, thereby suppressing decrease in quality of printing.

SUMMARY OF THE INVENTION

According to the present disclosure, a print data correction method that is executed by a printing device, includes:
 printing a first correction chart with a printer that performs printing;
 obtaining a first correction value based on the printed first correction chart;
 printing a second correction chart based on the first correction value with the printer;
 obtaining a second correction value based on the printed second correction chart; and
 correcting, based on the second correction value, print data to be printed by the printer.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein:

FIG. 6 illustrates a printing process with the print head that is inclined;

FIG. 8A shows an example of a pattern A that constitutes a second correction chart;

FIG. 8B shows an example of a block A printed by repeating the pattern A shown in FIG. 8A;

FIG. 9A shows an example of a pattern B that constitutes the second correction chart;

FIG. 9B shows an example of a block B printed by repeating the pattern B shown in FIG. 9A;

FIG. 10A shows an example of part of the second correction chart in which the pattern A and the pattern B are perfectly superposed;

FIG. 10B shows an example of part of the second correction chart in which the pattern A and the pattern B are not perfectly superposed;

FIG. 11A is a correspondence table for explaining correspondence between the second correction chart and a second correction value obtained from the second correction chart;

FIG. 11B schematically shows an example of gaps that appear in unit blocks of the second correction chart;

DETAILED DESCRIPTION

Referring to FIG. 1 to FIG. 16, one or more embodiments of the present disclosure will be described.

Although various limitations technically preferable for carrying out the present disclosure are put on the embodiment(s) described below, the technical scope of the present disclosure is not limited to the embodiment(s) below or illustrated examples.

For example, in the following embodiment(s), as a printing device, there is described a nail printing device that performs printing on fingernails of hands as its printing target. However, the printing target of the printing device of the present disclosure is not limited to fingernails of hands, but may be toenails of feet. Further, the printing target is not even limited to nails, but may be surfaces of nail chips, various accessories, or the like.

Figure 1:
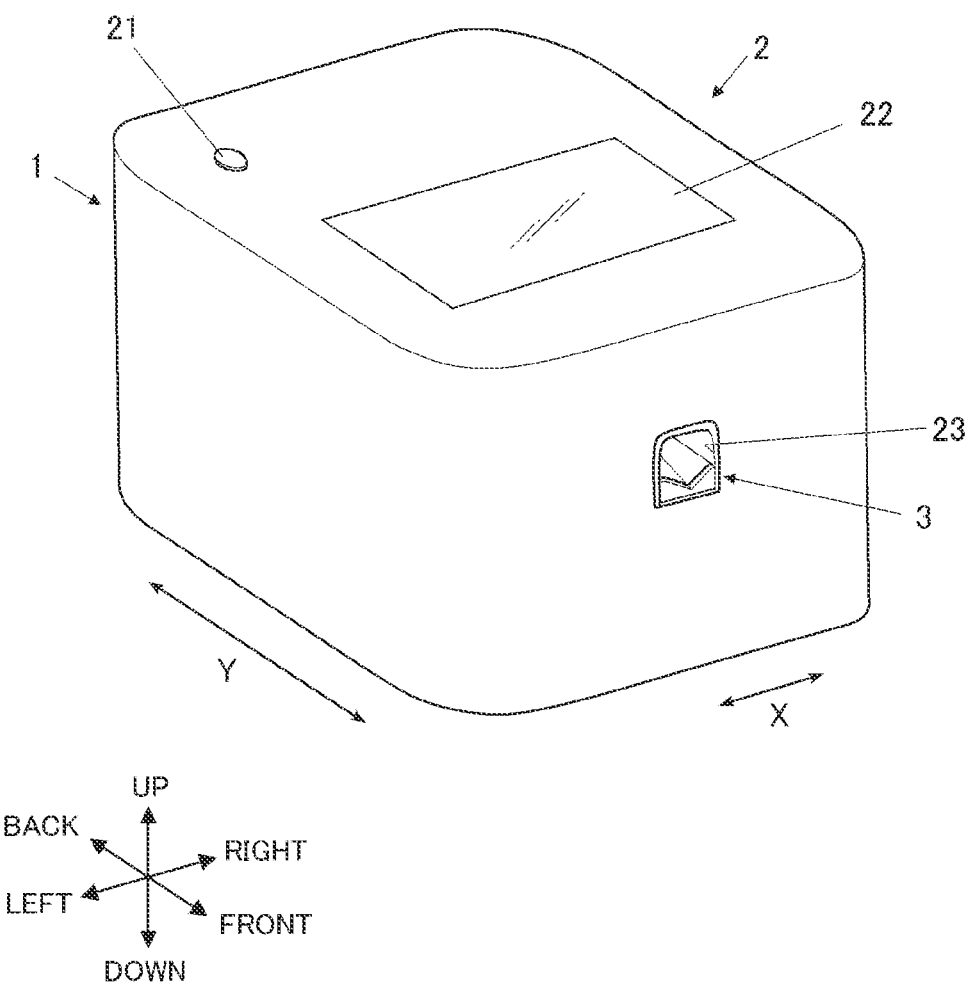
FIG. 1 is a perspective view of a printing device according to an embodiment(s), schematically showing its external configuration.

FIG. 1 is a perspective view of a printing device (nail printing device) of an embodiment(s), schematically showing its external configuration.

In the following embodiment(s), up, down, left, right, front and back or similar expressions refer to directions/orientations shown in FIG. 1. Also, X direction and Y direction respectively refer to the left-right direction and the front-back direction shown in FIG. 1.

As shown in FIG. 1, a printing device 1 has an approximately box-shaped case 2.

On the upper surface (top plate) of the case 2, an operation unit 21 and a display 22 are disposed.

Shapes and arrangement of the components of the case 2 are not limited to those shown in FIG. 1, but may be set appropriately. For example, the operation unit 21 and the display 22 may be disposed not on the upper surface of the case 2 but on the side surface, the back surface or the like of the case 2. Further, although FIG. 1 shows the operation unit 21 made up of one button, the operation unit 21 may be made up of a plurality of buttons disposed on the upper surface or the like of the case 2. The case 2 may further has an indicator or the like.

The operation unit 21 is for a user to make various inputs.

The operation unit 21 is, for example, an operation button, such as a power switch button to turn on and off a power source of the printing device 1.

When the operation unit 21 is operated by the user, an operation signal corresponding to the operation is output to a controller 11, and the controller 11 performs control in accordance with the operation signal, thereby operating the components of the printing device 1. For example, if the operation unit 21 is a power switch button, the printing device 1 is powered on or off in response to a user operation on the button.

In this embodiment, the printing device 1 cooperates with, for example, a terminal device 8 (shown in FIG. 4) described later. Hence, the components of the printing device 1 may be operated in accordance with an operation signal input from not the operation unit 21 but an operation unit 83 (shown in FIG. 4) of the terminal device 8.

The display 22 is, for example, a liquid crystal display (LCD), an organic electroluminescent display or another flat display.

The surface of the display 22 may be integrated with a touchscreen for the user to make various inputs. In this case, the touchscreen functions as the operation unit 21.

The display 22 may display a nail design input/selected by the user through the operation unit 21 or the like, a nail image generated by imaging a nail of the user, and so forth.

Further, as described later, in this embodiment, a print head 41 (printer, shown in FIG. 4) prints a chart for correction (hereinafter "correction chart") on a correction sheet of paper P. If an image of a printed correction chart is obtained, the display 22 may display the image.

The display 22 may also display a message screen or the like where an instruction(s), guidance, a warning(s) or the like for the user is displayed.

At approximately the center in the left-right direction (X direction in FIG. 1) of the front surface of the case 2 of the printing device 1 (on the front/near side in the Y direction in FIG. 1), a finger insertion port 23 is formed. The finger insertion port 23 is an opening into which a finger is inserted when printing is performed by the printing device 1.

The case 2 houses a finger placement unit 3, a printing mechanism 4 (shown in FIG. 4), an imager 5 (shown FIG. 4) and so forth, which constitute the body of the printing device 1.

The finger placement unit 3 is disposed in the case 2 at a position corresponding to the finger insertion port 23.

Figure 2:
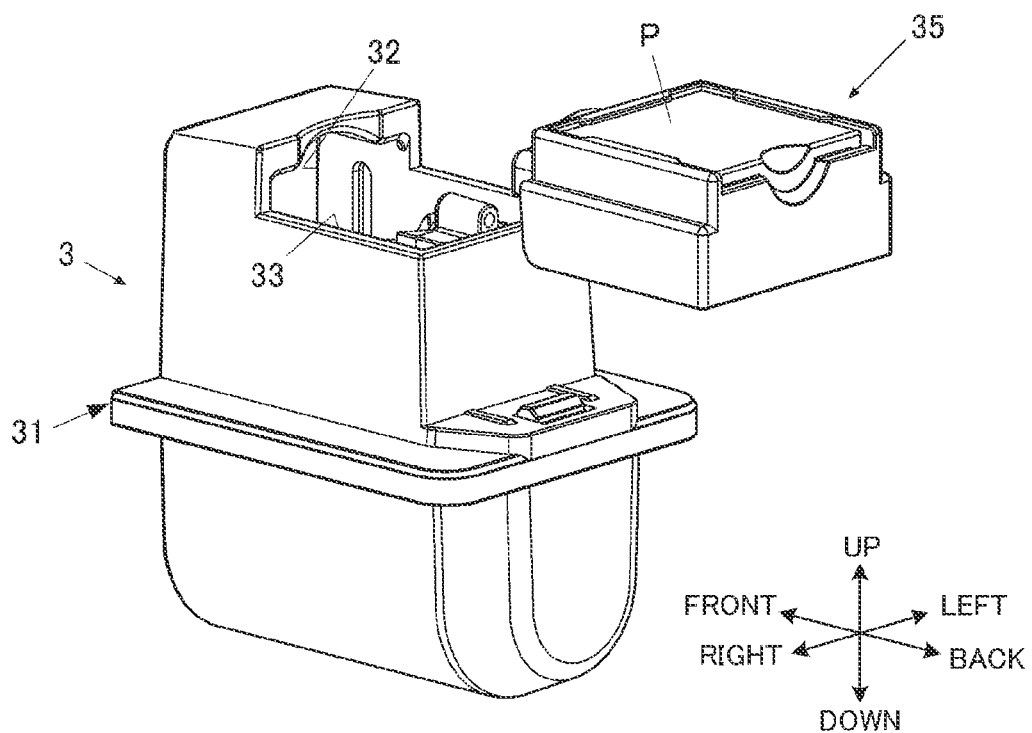
FIG. 2 is a perspective view of an example of a finger placement unit provided in the printing device.

FIG. 2 is a perspective view of the finger placement unit 3 viewed obliquely from its back side.

As shown in FIG. 2, the body 31 of the finger placement unit 3 has an opening 32 corresponding to the finger insertion port 23. The finger, the nail of which is the printing target, inserted through the finger insertion port 23 is further inserted through the opening 32 and held at a position in the finger placement unit 3 suitable for printing.

On the upper surface of the finger placement unit 3, a window 33 is formed that exposes the nail of the finger inserted through the opening 32. In this embodiment, an area corresponding to the window 33 is a movable area (printable area) where the print head 41 (shown in FIG. 4) described later can at least move during printing.

As shown in FIG. 2, the finger placement unit 3 of this embodiment includes an attachable/detachable sheet placement part 35 for placing a correction sheet of paper P (shown in FIG. 3, hereinafter "correction sheet P") at a predetermined position when the correction sheet P is the printing target.

FIG. 2 shows that the sheet placement part 35 is about to be attached to the body 31 of the finger placement unit 3. As shown in FIG. 2, the sheet placement part 35 is attached to the finger placement unit 3 from behind the finger placement unit 3 so as to cover the window 33.

Material of the correction sheet P is not specifically limited, but it is preferable that its surface be free of irregularities. The correction sheet P is a medium of a size that can be set on/in the sheet placement part 35, and is, for example, a piece of paper of a size (e.g., about 30 mm×30 mm) that is approximately the same as that of the movable area (printable area) of the print head 41.

By attaching the sheet placement part 35 with the correction sheet P set to the body 31 of the finger placement unit 3, the surface of the correction sheet P (i.e., printing target surface in the case where the correction sheet P is the printing target) is arranged so as to be approximately flush with the surface of a nail (i.e., printing target surface in the case where the nail is the printing target) when the nail (finger) is arranged at a position suitable for printing.

Figure 3:
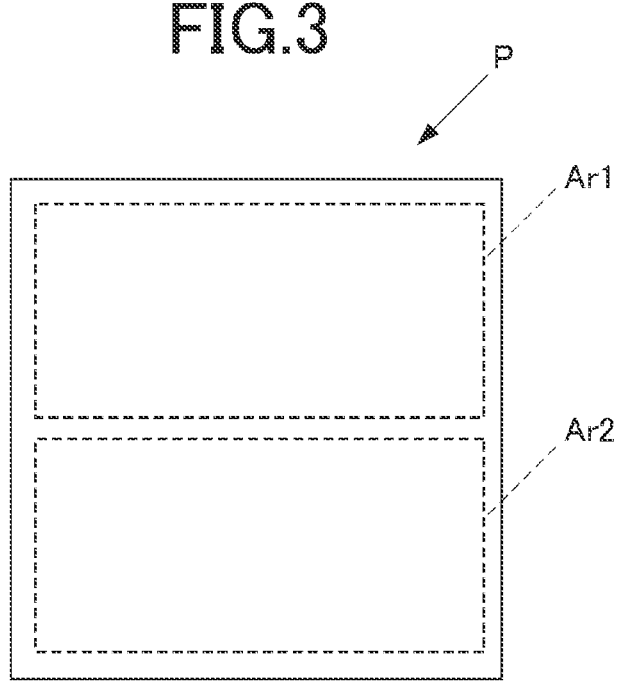
FIG. 3 is a plan view of an example of a correction sheet in the embodiment.

As shown in FIG. 3, in this embodiment, the correction sheet P is a correction value obtaining medium for obtaining a correction value(s) provided with at least a first correction value obtaining area (Ar1 in FIG. 3) for obtaining a first correction value and a second correction value obtaining area (Ar2 in FIG. 3) for obtaining a second correction value. The print head 41 of the printing mechanism 4 described later prints a first correction chart in the first correction value obtaining area Ar1 and a second correction chart in the second correction value obtaining area Ar2.

The correction charts, which are printed on the correction sheet P, will be described later in detail.

Figure 4:
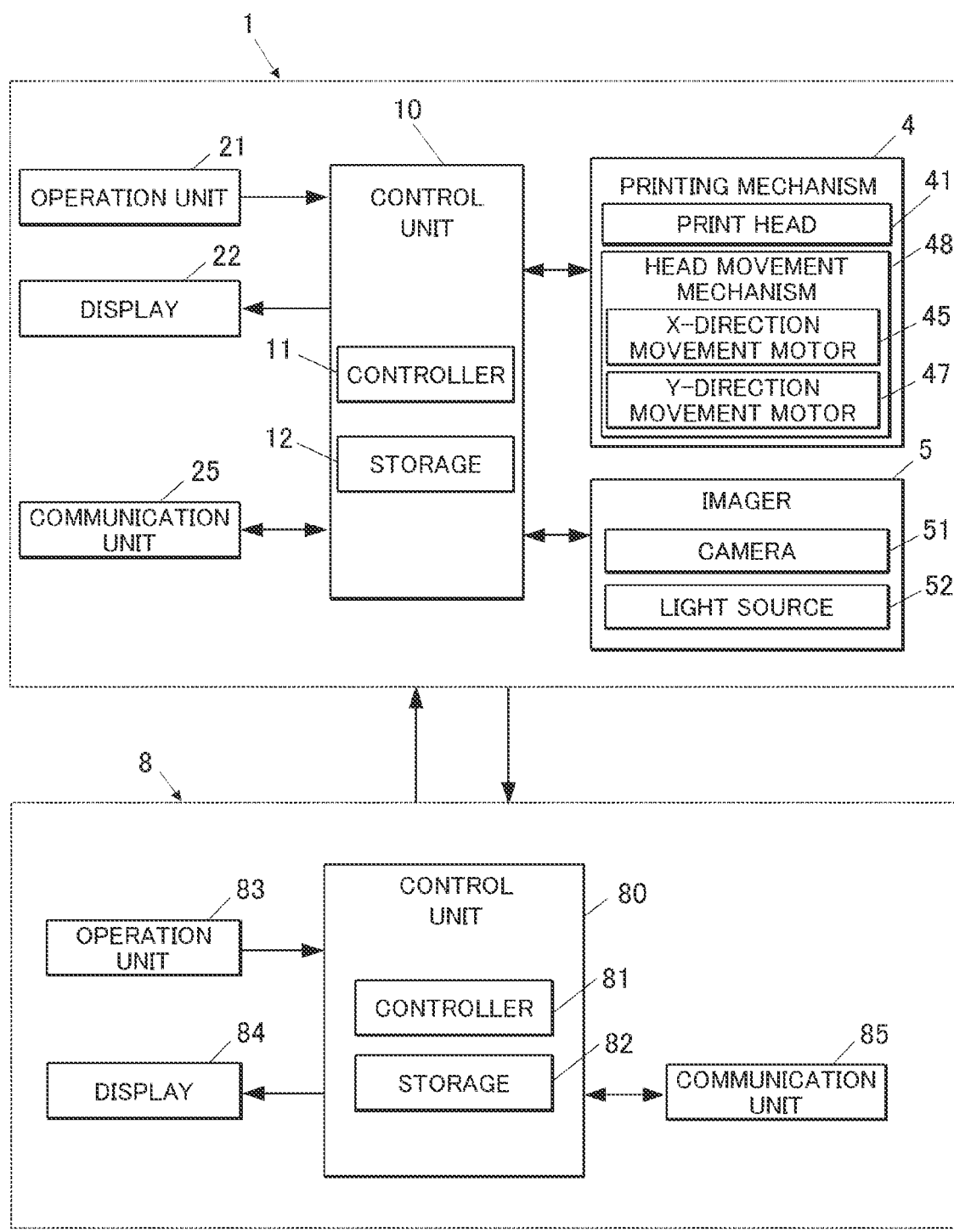
FIG. 4 is a block diagram schematically showing the control configuration of the printing device and a terminal device that cooperates with the printing device in the embodiment.

FIG. 4 is a block diagram schematically showing the control configuration of the printing device 1 and the terminal device 8 that cooperates with the printing device 1.

As shown in FIG. 4, the printing mechanism 4 includes the print head 41 and a head movement mechanism 48 that moves the print head 41.

In this embodiment, the printing mechanism 4 performs printing with the print head 41 on the nail of a finger or the like, which is the printing target in main printing, and on the correction sheet P (correction value obtaining medium), which is the printing target in printing for correction (correction printing).

The print head 41 of this embodiment is an inkjet head that (i) has a surface that faces the printing target surface (surface of a nail or surface of a correction sheet P), the surface being configured as an ink ejection surface provided with a plurality of nozzle ports to eject ink, and (ii) produces fine droplets of ink and directly sprays the ink from the ink ejection surface to the printing target surface, thereby performing printing. The print head 41 is not particularly limited in configuration, but may be a cartridge-integrated head in which an ejection mechanism, such as the ink ejection surface, and an ink cartridge, where ink is stored, are integrated, for example.

The print head 41 can eject color inks, such as cyan (C), magenta (M) and yellow (Y) inks. The print head 41 may also be able to eject an ink for undercoating, such as white ink, as a paint for forming a base. The type of ink provided in the print head 41 is not limited thereto.

The head movement mechanism 48 has an X-direction movement mechanism that moves the print head 41 in the left-right direction (X direction) of the printing device 1 and a Y-direction movement mechanism that moves the print head 41 in the front-back direction (Y direction) of the printing device 1.

The X-direction movement mechanism includes an X-direction movement motor 45 (shown in FIG. 4). The X-direction movement motor 45 operates to move the print head 41 in the left-right direction (X direction) of the printing device 1. The Y-direction movement mechanism includes a Y-direction movement motor 47 (shown in FIG. 4). The Y-direction movement motor 47 operates to move the print head 41 in the front-back direction (Y direction) of the printing device 1. The X-direction movement motor 45 and the Y-direction movement motor 47 are stepping motors, for example.

In this embodiment, the left-right direction (X direction) of the printing device 1 is a main-scanning direction, and a direction perpendicular to this main-scanning direction, namely the front-back direction (Y direction) of the printing device 1, is a sub-scanning direction.

Hereinafter, the configuration of the print head 41 of the printing mechanism 4 will be described in detail.

Figure 5A:
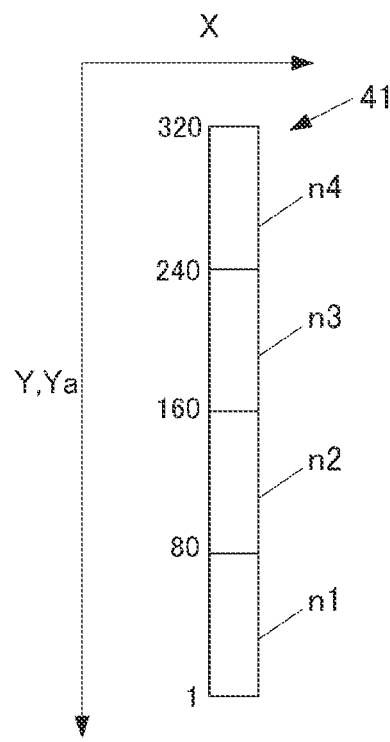
FIG. 5A is a plane view of a print head, showing an example of its configuration.
Figure 5B:
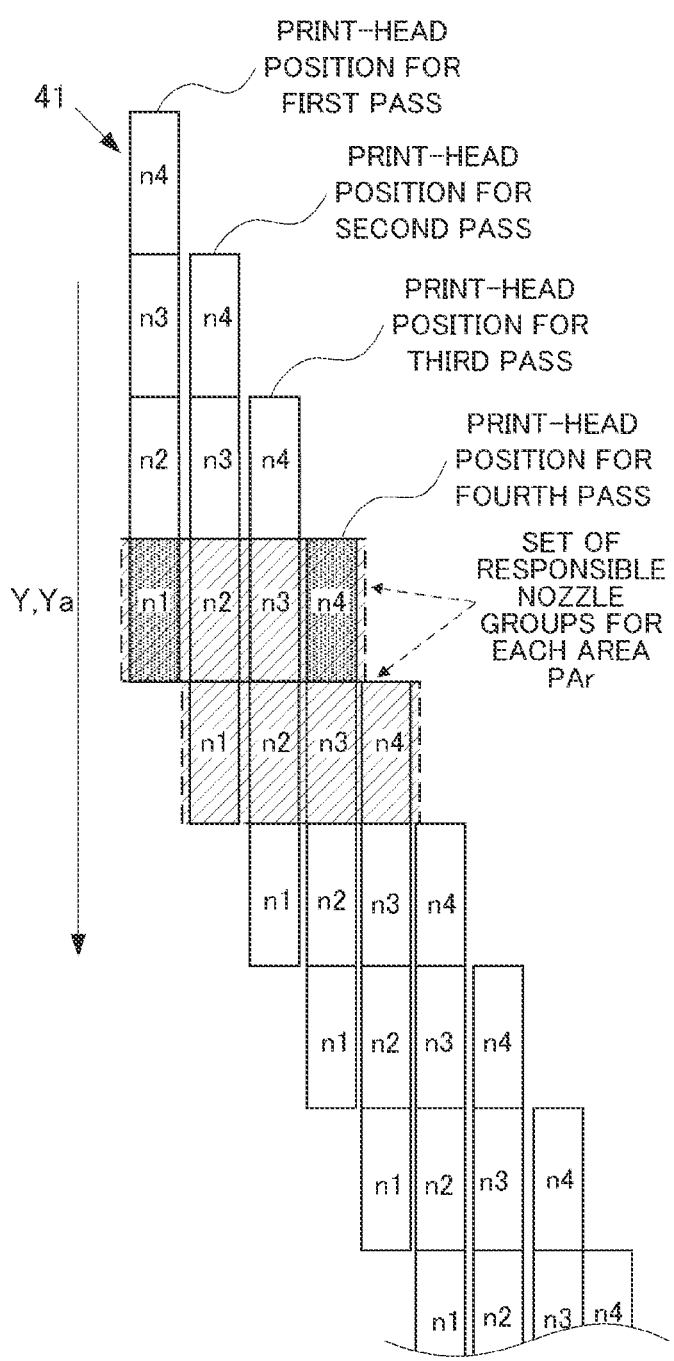
FIG. 5B illustrates multi-pass printing.

FIG. 5A schematically shows an example of the print head of this embodiment, and FIG. 5B schematically shows a state in which the print head shown in FIG. 5A completes one printing block by repeatedly performing printing thereon and moving in the sub-scanning direction.

The print head 41 has a plurality of nozzles arranged in line along its lengthwise direction. In the normal state, as shown in FIG. 5A and FIG. 5B, the nozzle line direction (lengthwise direction of the print head 41), in which the nozzles are arranged, is parallel to the sub-scanning direction Y, which is perpendicular to the main-scanning direction X.

The printing mechanism 4 of this embodiment employs a multi-pass method by which printing on an (each) area (printing block) PAr is performed by/during multiple (n) passes (i.e., scans in the main-scanning direction X).

In this embodiment, first nozzles (nozzle group n1) to nth nozzles (nozzle group nn) are in charge of (i.e., responsible for) printing during the first pass to printing during the nth pass, respectively.

FIG. 5A schematically shows the print head 41. In FIG. 5A, numerals on the left side of the print head 41 represent the number of nozzles and nozzle numbers.

FIG. 5A shows an example in which the print head 41 has 320 nozzles arranged along the lengthwise direction, and these nozzles are divided into four nozzle groups (n1 to n4) to perform printing on each area PAr by four passes.

In the example shown in FIG. 5A, the nozzle group n1 is made up of nozzles 1 to 80, the nozzle group n2 is made up of nozzles 81 to 160, the nozzle group n3 is made up of nozzles 161 to 240, and the nozzle group n4 is made up of nozzles 241 to 320.

In this embodiment, the print head 41 repeatedly performs printing and moves in the sub-scanning direction. More specifically, as shown in FIG. 5B, the print head 41 moves a distance of the length of one nozzle group (n1, n2, n3 or n4) (¼ of the length of all the nozzles that the print head 41 has in this embodiment) in the sub-scanning direction Y (forward direction Ya in FIG. 5B) each time one pass finishes, thereby performing printing on an area (print block) PAr by four passes.

If attention is paid to one area PAr in FIG. 5B, printing on the area PAr is completed by printing with the nozzle group n1 as the first pass for the area PAr, printing with the nozzle group n2 as the second pass for the area PAr, printing with the nozzle group n3 as the third pass for the area PAr, and printing with the nozzle group n4 as the fourth pass for the area PAr. In FIG. 5B, a set of nozzle groups to be used (a set of responsible nozzle groups) for an area PAr is enclosed by a broken line, as to two areas PAr as examples.

FIG. 6 schematically shows an example in which the print head is inclined toward the main-scanning direction from the sub-scanning direction.

In the example shown in FIG. 6, the print head 41 is inclined to right (right in the X direction in FIG. 6) from the state parallel to the sub-scanning direction Y such that the leading side (where the nozzle group n1 is provided in FIG. 6) of the print head 41 is located right in relation to the trailing side thereof.

In this case, if, as in the case shown in FIG. 5B, the print head 41 repeatedly performs printing and moves a distance of the length of one nozzle group (n1, n2, n3 or n4) (¼ of the length of the print head 41) in the sub-scanning direction Y (forward direction Ya in FIG. 6) each time one pass finishes, thereby performing printing on an area (print block) PAr (enclosed by a broken line in FIG. 6) by four passes, printings during passes differ in position from one another due to the inclination of the print head 41.

As shown in FIG. 6, if the print head 41 is inclined from the sub-scanning direction Y, especially printing during the first pass with the nozzle group n1 and printing during the nth pass (fourth pass in the example shown in FIG. 6) with the nozzle group nn (nozzle group n4 in the example shown in FIG. 6) greatly differ in position from one another. For this reason, as described later, in correction printing for obtaining a correction value(s), the amount of positional difference between printing during the first pass with the nozzle group n1 on an area (print block) PAr and printing during the nth pass (fourth pass in the example shown in FIG. 6) with the nozzle group nn (nozzle group n4 in the example shown in FIG. 6) on the area PAr is obtained.

More specifically, after printing during the first pass with the nozzle group n1, printing during the fourth pass with the nozzle group n4 is performed, skipping printing during the second pass with the nozzle group n2 and printing during the third pass with the nozzle group n3. Use of the printed pattern by printing first time on an area PAr and the printed pattern by printing last time on the area PAr, between which the amount of positional difference is the largest, for comparison for correction makes it possible to obtain a high-accuracy correction value.

Details of the first and second correction charts and a method(s) for obtaining the first and second correction values based on the first and second correction charts will be described later.

The imager 5 is disposed at a position that is on the inner side of the upper surface (top panel) of the case 2 and above the window 33 of the finger placement unit 3 (or correction sheet P if the sheet placement part 35 is attached to the finger placement unit 3). The imager 5 images the nail (finger including the nail) exposed through the window 33 or the correction sheet P set on the sheet placement part 35, thereby obtaining an image thereof.

The imager 5 includes a camera 51 and a light source 52 (shown in FIG. 4). The camera 51 is, for example, a small-sized camera that includes a solid state image sensor, such as a CCD (Charge Coupled Device) image sensor or a CMOS (Complementary Metal Oxide Semiconductor) image sensor, having two million pixels or more, and a lens. The light source 52 is, for example, a white LED that illuminates an imaging target (i.e., printing target).

The imager 5 is not particularly limited in its specific position as far as it is disposed at a position where it can image the nail of a finger placed in the finger placement unit 3 or the correction sheet P set on the sheet placement part 35. For example, the imager 5 may be movable in the X, Y directions by the head movement mechanism 48 that moves the print head 41.

As shown in FIG. 4, the printing device 1 includes, in addition to the abovementioned printing mechanism 4 and imager 5, a communication unit 25 and a control unit 10.

The communication unit 25 can transmit and receive information to and from the terminal device 8 that operates in cooperation with the printing device 1.

Communication between the printing device 1 and the terminal device 8 is performed, for example, by a wireless LAN. The communication between the printing device 1 and the terminal device 8 is not limited thereto, but may be performed by another system. For example, the communication may use a network line, such as the Internet, or may be wireless communication based on a short-range wireless communication standard, such as Bluetooth® or Wi-Fi. This communication is not even limited to wireless communication. The communication unit 25 may be configured to transmit and receive various data to and from the terminal device 8 by wired connection. The communication unit 25 includes an antenna chip and/or the like that agrees with the communication system of the terminal device 8.

The control unit 10 included in the printing device 1 is a computer that includes: a controller 11 including a processor, such as a central processing unit (CPU); and a storage 12 including a read only memory (ROM) and a random access memory (RAM).

The storage 12 stores various programs, various data and so forth that cause the printing device 1 to operate.

More specifically, the ROM or the like of the storage 12 stores various programs, such as a printing program for a printing process. The controller 11 loads these programs to a working area of the RAM and executes same, thereby performing overall control of the components of the printing device 1.

The controller 11 controls operation of the printing mechanism 4. The CPU of the controller 11 performs various functions by working together with the programs stored in the ROM of the storage 12.

The controller 11 has a function to set the first correction value. When the print head 41 of the printing mechanism 4 prints the first correction chart in the first correction value obtaining area Ar1 of the correction sheet P, the controller 11 sets the correction value obtained based on the first correction chart as the first correction value.

Figure 16:
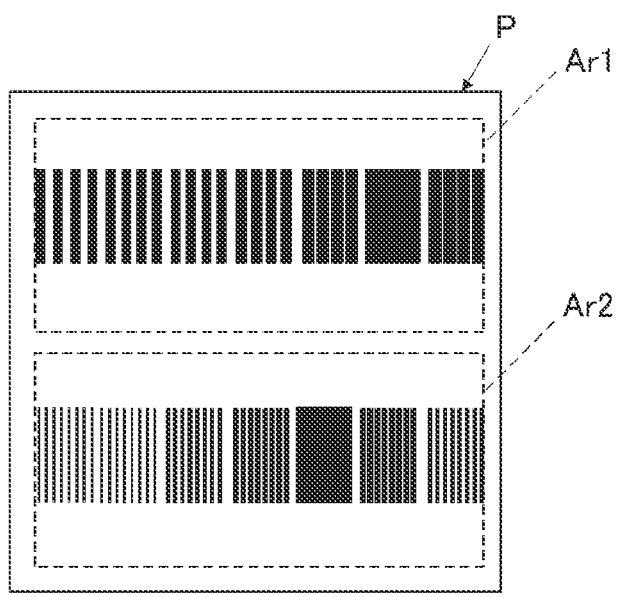
FIG. 16 shows an example of the first correction chart and the second correction chart printed on a correction sheet.

In this embodiment, the part having the highest density (i.e., highest density part or darkest part) of the first correction chart printed in the first correction value obtaining area Ar1 as shown in FIG. 16, which is described later, is read, and a correction value is obtained accordingly.

The method for obtaining the first correction value is not particularly limited.

For example, the camera 51 of the imager 5 images the first correction value obtaining area Ar1 where the first correction chart has been printed, thereby obtaining an image thereof, and the controller 11 processes the image, and reads the highest density part of the first correction chart, and obtains a correction value automatically. The display 22 or the like may display the image obtained by the camera 51 for the user to look at the image to read the highest density part of the first correction chart. Alternatively, without imaging with the camera 51, the user may look at the correction sheet P itself where the first correction chart has been printed to read the highest density part of the first correction chart.

If the controller 11 obtains a correction value automatically, the controller 11 sets the obtained correction value as the first correction value.

If the user reads the highest density part of the first correction chart by looking at the correction sheet P itself or looking at the image displayed by the display 22 or the like, the user inputs the amount of positional difference corresponding to the highest density part, which the user has read, through the operation unit 21 or the like, so that the controller 11 obtains a correction value and sets the correction value as the first correction value.

The controller 11 also has a function to set a printing position for a chart to be printed. The controller 11 sets, for the second correction chart, a printing position in the second correction value obtaining area Ar2 in accordance with the obtained (set) first correction value.

In this embodiment, the controller 11 obtains (sets) the first correction value based on the amount of positional difference corresponding to the highest density part (highest density unit block) of the first correction chart, and when the second correction chart is to be printed, sets a printing position for the second correction chart such that the part that corresponds to the amount of positional difference and based on which the first correction value is obtained is arranged at the center of the second correction chart (as the central unit block if the second correction chart is made up of a plurality of unit blocks).

The controller 11 also has a function to set the second correction value. When the print head 41 prints the second correction chart at the printing position in the second correction value obtaining area Ar2, the controller 11 sets the correction value obtained based on the second correction chart as the second correction value.

In this embodiment, like the first correction value, the part having the highest density in the second correction chart printed in the second correction value obtaining area Ar2 is read, and a correction value is obtained accordingly. The method for obtaining the second correction value may be the same as that for obtaining the first correction value. That is, the controller 11 may obtain the second correction value automatically from an image obtained by the camera 51 or from the user who looks at the correction sheet P itself or the image.

If the controller 11 obtains a correction value automatically, the controller 11 sets the obtained correction value as the second correction value.

If the user reads the highest density part of the second correction chart by looking at the correction sheet P itself or looking at the image displayed by the display 22 or the like, the user inputs the amount of positional difference corresponding to the highest density part, which the user has read, through the operation unit 21 or the like, so that the controller 11 obtains a correction value and sets the correction value as the second correction value.

The controller 11 also has a function to correct data. The controller 11 corrects print data to be printed by the print head 41 based on the second correction value. For example, if it is found from the second correction chart that an image (e.g., design) to be printed will shift one pixel in the main-scanning direction X, the controller 11 corrects print data for one pixel in the main-scanning direction X.

The controller 11 may perform, other than correction of print data based on the second correction value for the inclination of the print head 41, various types of correction, such as curved surface correction for the curvature of a nail as the printing target.

As described above, the printing device 1 of this embodiment can communicate with the terminal device 8, and therefore performs printing and so forth in accordance with operation commands from the terminal device 8.

The terminal device 8 of this embodiment is, for example, a portable terminal, such as a smartphone or a tablet. However, the terminal device 8 is not particularly limited as far as it can communicate with the printing device 1. Examples thereof include a laptop PC, a stationary PC, and a terminal device for gaming.

As shown in FIG. 4, the terminal device 8 includes the abovementioned operation unit 83, a display 84, a communication unit 85 and a control unit 80.

The operation unit 83 is configured to make/do various inputs/settings or the like in response to user operations. When the operation unit 83 is operated by the user, an input signal corresponding to the operation is transmitted to the control unit 80. In this embodiment, the surface of the display 84 may be integrated with a touchscreen for the user to make operations for various inputs/settings or the like by touch operations thereon.

The operation unit 83 for various inputs/settings or the like is not limited to the touchscreen. For example, the operation unit 83 may include various operation buttons, a keyboard, a pointing device and/or the like.

In this embodiment, the user can select a nail design to be printed on a nail by operating the operation unit 83, for example.

The touchscreen configured on the display 84 displays various display screens under the control of a controller 81 described later.

The display 84 can also display a nail design input/selected by the user through the operation unit 83, an image transmitted from the printing device 1, and so forth.

In this embodiment, when the first correction chart and/or the second correction chart are printed on the correction sheet P, and an image(s) thereof is obtained by the camera 51, the display 84 may display the image.

The communication unit 85 can transmit print data to the printing device 1. Also, the communication unit 85 receives data of a nail image or the like transmitted from the printing device 1. The communication unit 85 includes a wireless communication module or the like capable of communicating with the communication unit 25 of the printing device 1.

The communication unit 85 may be any type as far as it can communicate with the printing device 1, namely agrees with the communication standard of the communication unit 25 of the printing device 1.

The control unit 80 is a computer that includes: the controller 81 including a central processing unit (CPU); and a storage 82 including a read only memory (ROM) and a random access memory (RAM).

The controller 81 performs overall control of the components of the terminal device 8. The controller 81 performs various functions by working together with programs stored in the storage 82.

The storage 82 stores various programs, various data and so forth that cause the components of the terminal device 8 to operate.

More specifically, the storage 82 of this embodiment stores various programs, such as an operating program for performing overall control of the components of the terminal device 8 and a nail printing application program for performing nail printing with the printing device 1. The control unit 80 loads these programs, for example, to a working area of the storage 82 and executes same, thereby controlling the terminal device 8.

The storage 82 of this embodiment also stores various design data (data of nail designs).

Next, a print data correction method and operation of the printing device 1 will be described with reference to FIG. 7 and the like.

Figure 7:
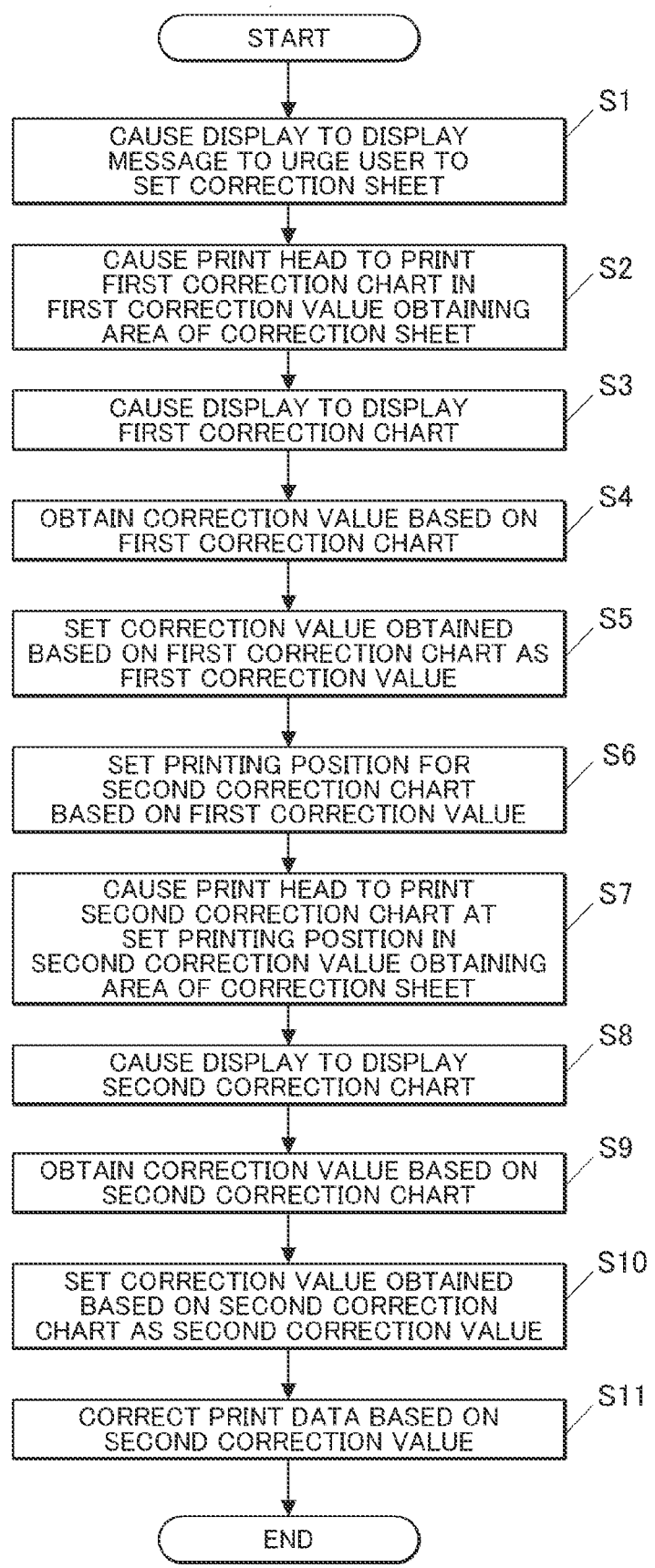
FIG. 7 is a flowchart of a print data correction process in the embodiment.

FIG. 7 is a flowchart of a print data correction process.

When the printing device 1 and the terminal device 8 that cooperates with the printing device 1 are powered on, the nail printing application program of the terminal device 8 starts.

This causes, as shown in FIG. 7, the display 22 of the printing device 1 and/or the display 84 of the terminal device 8 to display a message to urge the user to set a correction sheet P (Step S1). If the printing device 1 or the terminal device 8 has an audio outputter, such as a speaker, the outputter may output audio guidance instead of or in addition to the display 22/84 displaying the message.

When guided so, the user sets a correction sheet P on the sheet placement part 35 and attaches the sheet placement part 35 to the finger placement unit 3.

When the correction sheet P is set, the controller 11 controls the printing mechanism 4 to cause the print head 41 to print a correction chart(s). In this embodiment, the print head 41 prints, as the correction chart(s), the abovementioned first correction chart and second correction chart on the correction sheet P.

Hereinafter, the correction charts of this embodiment will be described in detail.

In this embodiment, a state in which the print head 41 is not displaced (inclined) (state in which the print head 41 is parallel to the sub-scanning direction Y or state shown in FIG. 5A and FIG. 5B) is referred to as "no positional difference" (amount of positional difference is "0"); a state in which the print head 41 is displaced (inclined) such that the leading side of the print head 41 in the sub-scanning direction Y (forward direction Ya) is located left in relation to the trailing side thereof is referred to as the amount of positional difference in "+" direction; and a state in which the print head 41 is displaced (inclined) such that the leading side of the print head 41 in the sub-scanning direction Y (forward direction Ya) is located right in relation to the trailing side thereof is referred to as the amount of positional difference in "−" direction.

The first correction chart can handle a wide range of the amount of positional difference (e.g., from +6 pixels to −6 pixels) by being printed in a relatively small (narrow) area. However, the accuracy of the correction value obtained from the first correction chart is low, which is not suitable for high-quality printing.

Meanwhile, the second correction chart is a correction chart from which a high-accuracy correction value can be obtained, handling a range of the amount of positional difference from −3 pixels to +3 pixels. In order to handle a wider range than the above, a larger correction chart (i.e., having more unit blocks) than the above needs to be printed in a larger correction value obtaining area.

In order to perform high-accuracy correction that is sufficient for high-quality printing, a high-accuracy correction value needs to be obtained. For this reason, it is preferable to use a high-resolution correction chart (second correction chart in this embodiment). However, there is also a demand to handle a wide range of the amount of positional difference. For example, if a high-resolution correction chart in units of one pixel or the like is printed, accurate correction can be performed as far as the amount of positional difference is within the range that can be handled by (corrected with) the chart. However, if the amount of positional difference is not within the range that can be handled by the chart, a correction value cannot be obtained from the chart. On the other hand, if a low-resolution correction chart in units of two pixels or the like is printed, since the chart can handle a wide range of the amount of positional difference, the amount of positional difference of a print head concerned is likely to be within the range. However, correction in units of one pixel cannot be performed and correction accuracy is low accordingly. That is, it has been difficult for a printing device having a relatively small printable area to correct a wide range of the amount of positional difference with high accuracy.

In order to deal with such a problem, in this embodiment, the first correction chart and the second correction chart, which is a higher-resolution correction chart than the first correction chart, are printed on the correction sheet P to obtain correction values of two levels, and a higher-accuracy correction value (second correction value) obtained from the second correction chart is used to correct print data.

A correction chart forming method common to the first correction chart and the second correction chart will be described first.

As described above, the print head 41 of this embodiment employs the multi-pass method, by which printing on each area, for example, an area PAr in FIG. 6, is performed by multiple passes from the first pass to the nth pass, and has the first nozzles to the nth nozzles that are in charge of printing during the first pass to printing during the nth pass on the area PAr, respectively. In this case, a correction chart is formed by printing during the first pass with the first nozzles (first printing) and printing during the nth pass with the nth nozzles (second printing).

If the print head 41 is inclined from the sub-scanning direction Y, especially printing during the first pass with the nozzle group n1 and printing during the nth pass (fourth pass in the example shown in FIG. 6) with the nozzle group nn (nozzle group n4 in the example shown in FIG. 6) greatly differ in position from one another. That is, as shown in FIG. 6, if attention is paid to printing on one area PAr, especially printing with the nozzle group provided at the leading end of the print head 41 that is in charge of the first pass for the area PAr and printing with the nozzle group provided at the trailing end of the print head 41 that is in charge of the last pass for the area PAr greatly differ in position from one another.

For this reason, a correction chart is formed by printing during the first pass with the nozzle group n1 (first printing) on an area PAr and printing during the nth pass (fourth pass in the example shown in FIG. 6) with the nozzle group nn (nozzle group n4 in the example shown in FIG. 6) (second printing) on the area PAr.

For example, in the case where the print head 41 completes printing on one area PAr by four passes while moving in the sub-scanning direction Y (forward direction Ya) in units of ¼ of the head length (length of all the nozzles) of the print head 41, as shown in FIG. 6, the print head 41 moves in the sub-scanning direction Y (forward direction Ya) ¼ of the head length (length of all nozzles) after performing printing during the first pass with the nozzle group n1 (first printing) on an area PAr, moves in the sub-scanning direction Y (forward direction Ya) another ¼ of the head length (length of all the nozzles) without performing printing during the second pass with the nozzle group n2, moves in the sub-scanning direction Y (forward direction Ya) another ¼ of the head length (length of all the nozzles) without performing printing during the third pass with the nozzle group n3, and moves in the sub-scanning direction Y (forward direction Ya) another ¼ of the head length (length of all the nozzles) and then performs printing during the fourth pass with the nozzle group n4 (second printing) on the area PAr.

A correction chart is formed by the first printing and the second printing that print patterns (blocks) that complement one another.

For example, FIG. 8A to FIG. 11B illustrate the second correction chart, which is a high-resolution correction chart.

In order to form the second correction chart, a block(s) A (FIG. 8B) is printed by the first printing, and a block(s) B (FIG. 9B) is printed by the second printing. The block A is printed by repeatedly printing a pattern A (FIG. 8A) in the main-scanning direction X. The pattern A is a pattern of first six pixels painted and next three pixels not painted in the main-scanning direction X. The block B is printed by repeatedly printing a pattern B (FIG. 9A) in the main-scanning direction X. The pattern B is a pattern of first six pixels not painted and next three pixels painted in the main-scanning direction X. In FIG. 8A to FIG. 9B, one square represents one pixel, colored (shaded) squares represent pixels that are painted and colorless (unshaded) squares represent pixels that are not painted.

If the pattern (block) A and the pattern (block) B are printed by the first printing and the second printing with no positional difference from one another, as shown in FIG. 10A, the painted parts of the patterns (blocks) A, B are perfectly superposed on (i.e., perfectly coincide with) the unpainted parts of the patterns (blocks) B, A, respectively. In FIG. 10A and the like, the painted part of the pattern A and the painted part of the pattern B are different in color (density). This is merely for distinguishing the painted part of the pattern A and the painted part of the pattern B from one another. In practice, the painted part of the pattern A and the painted part of the pattern B may be the same color. The same applies to the other drawings.

The part (unit block) where the pattern A and the pattern B are perfectly superposed on top of one another has a high density as a whole.

In contrast, if the pattern (block) A and the pattern (block) B are printed by the first printing and the second printing with positional difference from one another, as shown in FIG. 10B, the painted parts of the patterns (blocks) A, B are not perfectly superposed on (i.e., do not perfectly coincide with) the unpainted parts of the patterns B, A (blocks), respectively, and gaps appear accordingly.

Thus, if the pattern (block) A and the pattern (block) B are printed by the first printing and the second printing with positional difference from one another, gaps appear in the part according to the amount of positional difference. The larger the amount of positional difference is, the lower the density of the part as a whole is.

FIG. 8B shows the block A printed by repeating the pattern A eight times, and FIG. 9B shows the block B printed by repeating the pattern B seven times.

In FIG. 8B and FIG. 9B, the pattern A and the pattern B are each painted at regular intervals such that the painted part of the pattern B is perfectly superposed on the unpainted part of the pattern A. In actual printing, while the pattern B is repeated to print blocks B, the painting start position (pixel) in each block B is shifted (i.e., made to differ in position) one pixel.

More specifically, although, assuming that the print head 41 is not inclined and no positional difference is present accordingly, blocks B are printed by repeating the pattern B in which first six pixels are not painted and next three pixels from the seventh pixel are painted, in actual printing, blocks B are printed as follows: when the pattern B is repeated to print the first block B, first three pixels are not painted and next three pixels from the fourth pixel as the painting start position are painted (i.e., the amount of positional difference is −3 pixels); when the pattern B is repeated to print the second block B, the painting start position is shifted one pixel rightward, so that first four pixels are not painted and next three pixels from the fifth pixel are painted (i.e., the amount of positional difference is −2 pixels); and when the pattern B is repeated to print the third block B, the painting start position is shifted another one pixel rightward, so that first five pixels are not painted and next three pixels from the sixth pixel are painted (i.e., the amount of positional difference is −1 pixel). When the pattern B is repeated to print the fourth block B, the painting start position is shifted another one pixel rightward, so that first six pixels are not painted and next three pixels from the seventh pixel, which is the original painting start position, are painted (i.e., the amount of positional difference is 0).

Further, when the pattern B is repeated to print the fifth block B, the painting start position is shifted another one pixel rightward. This means that the painting start position is shifted one pixel rightward in relation to the original painting start position, so that first seven pixels are not painted and next three pixels from the eighth pixel are painted (i.e., the amount of positional difference is +1 pixel). Similarly, when the pattern B is repeated to print the sixth block B, the painting start position is shifted another one pixel rightward, so that first eight pixels are not painted and next three pixels from the ninth pixel are painted (i.e., the amount of positional difference is +2 pixels), and when the pattern B is repeated to print the seventh block B, the painting start position is shifted another one pixel rightward, so that first nine pixels are not painted and next three pixels from the tenth pixel are painted (i.e., the amount of positional difference is +3 pixels). Thus, blocks B are printed while painting positions (i.e., ink landing positions) are shifted in units of one pixel. If the print head 41 is not inclined, the density at the center of the second correction chart is the highest as shown in FIG. 11B described later. On the other hand, if the print head 41 is inclined, the painting positions (ink landing positions) deviate toward the main-scanning direction according to the inclination of the print head 41. In other words, if the print head 41 is inclined, the painting result (second correction chart) obtained is different in the position of the darkest unit block in the main-scanning direction from the painting result in the case where the print head 41 is not inclined. This fact is used for obtaining a correction value corresponding to the amount of positional difference.

In contrast to the above, the pattern A is repeated to print blocks A, keeping its original pattern in which first six pixels are painted and next three pixels are not painted in the main-scanning direction X, namely keeping the first pixel in each block A as the painting start position.

It is noted that the "patterns that complement one another" for forming a correction chart is not limited to the illustrated pattern A (block A made up of continuous patterns A) and pattern B (block B made up of continuous patterns B).

If printing resolution is 600 dpi as an example, one pixel is about 0.0423 mm, and hence in order to detect the amount of positional difference from density difference, each unit block where the pattern (block) A and the pattern (block) B are superposed on top of one another needs to have a width (or length) of about 3 mm in terms of the resolution of the imager 5 or the like. In order to detect the amount of positional difference in units of one pixel within ±3 pixels, seven unit blocks are needed. If a space of 1 mm is provided between adjacent unit blocks, a printing length required for the detection is about 27 mm (3 mm×7 unit blocks+1 mm×6 spaces).

In this regard, although the printable area of the print head 41 of the printing device 1 of this embodiment is relatively small as mentioned above, a printing width of about 30 mm is secured in order to perform printing on the nail of a finger, and also the correction sheet P, which is set on the sheet placement part 35 of the finger placement unit 3, has an area of about 30 mm×30 mm, namely the same size as the printable area.

Hence, it is possible to print, on the correction sheet P, the second correction chart having seven unit blocks, which are required to detect the amount of positional difference in units of one pixel within ±3 pixels.

FIG. 11A is a table showing correction values (second correction value) readable from the second correction chart formed in the manner described above. In FIG. 11A, blocks A, each made up of continuous patterns A, and blocks B, each made up of continuous patterns B, are partly shown. FIG. 11B shows an example of the actual printing result. In FIG. 11A, parts enclosed by bold black lines are parts in each of which the pattern A (block A made up of continuous patterns A) and the pattern B (block B made up of continuous patterns B) are perfectly superposed, thereby being parts having the highest density.

In FIG. 11A and FIG. 11B, dimensions of each block A, each block B and each unit block where blocks A, B are superposed on top of one another are shortened for the sake of explanation, and hence differ from their actual dimensions.

For example, if the pattern B (block B made up of continuous patterns B) printed with the painting start position not shifted from the original one (i.e., block B in which first six pixels are not painted and next three pixels from the seventh pixel are painted) and the pattern A (block A made up of continuous patterns A) are perfectly superposed, it means that the print head 41 is not inclined, and no correction for positional difference in printing originating from the inclination of the print head 41 is needed accordingly. In this case, the part (unit block) corresponding to a correction value of "0" is the darkest. Hence, the correction value is "0".

Meanwhile, for example, if the pattern B (block B made up of continuous patterns B) printed with the painting start position shifted three pixels leftward from the original one by the inclination of the print head 41 and the pattern A (block A made up of continuous patterns A) are perfectly superposed, the part (unit block) corresponding to a correction value of "+3" (pixels) is the darkest. In this case, the correction value to be applied to print data is "+3" pixels.

As another example, if the pattern B (block B made up of continuous patterns B) printed with the painting start position shifted three pixels rightward from the original one by the inclination of the print head 41 and the pattern A (block A made up of continuous patterns A) are perfectly superposed, the part (unit block) corresponding to a correction value of "−3" (pixels) is the darkest. In this case, the correction value to be applied to print data is "−3" pixels.

Thus, the correction value to be applied to print data to deal with the positional difference in printing originating from the inclination of the print head 41 is obtained by determining which correction value corresponds to the darkest part of the printed second correction chart.

As mentioned above, the method for reading/obtaining a numeral value corresponding to the darkest part from the printing result of a correction chart is not particularly limited. That is, the controller 11 may obtain the numeral value automatically from an image of the printed second correction chart (correction sheet P) obtained by the camera 51 or from the user who looks at the correction sheet P itself or the image thereof, or from the user or someone else who looks at the correction sheet P, where the second correction chart has been printed, by once taking it out from the printing device 1.

The second correction chart makes it possible to accurately obtain the direction and the degree of positional difference in units of one pixel within ±3 pixels as far as the highest density of the printing result or the part thereof where the two patterns (pattern A and pattern B) are perfectly superposed with no gap can be recognized. However, if recognition of the highest density of the printing result, the part thereof where the two patterns are perfectly superposed or relative density between parts thereof is performed by the user with his/her eyes, it is difficult to determine the amount of positional difference (recognize density difference) in units of one pixel. In this case, the amount of positional difference accurately obtainable is in units of two pixels or so.

FIG. 12A to FIG. 14B illustrate the first correction chart, which is inferior to the second correction chart in terms of resolution, but can handle a wider range of the amount of positional difference than the second correction chart.

In order to form the first correction chart, a block(s) C (FIG. 12B) is printed by the first printing, and a block(s) D (FIG. 13B) is printed by the second printing. The block C is printed by repeatedly printing a pattern C (FIG. 12A) in the main-scanning direction X. The pattern C is a pattern of first 12 pixels painted and next six pixels not painted in the main-scanning direction X. The block D is printed by repeatedly printing a pattern D (FIG. 13A) in the main-scanning direction X. The pattern D is a pattern of first 12 pixels not painted and next six pixels painted in the main-scanning direction X. In FIG. 12A to FIG. 13B, one square represents one pixel, colored (shaded) squares represent pixels that are painted and colorless (unshaded) squares represent pixels that are not painted.

If the pattern (block) C and the pattern (block) D are printed by the first printing and the second printing with no positional difference from one another, as in FIG. 10A, the painted parts of the patterns (blocks) C, D are perfectly superposed on (i.e., perfectly coincide with) the unpainted parts of the patterns (blocks) D, C, respectively. In FIG. 12A to FIG. 13B, the painted part of the pattern C and the painted part of the pattern D are different in color (density). This is merely for distinguishing the painted part of the pattern C and the painted part of the pattern D from one another. In practice, the painted part of the pattern C and the painted part of the pattern D may be the same color. The same applies to the other drawings.

The part (unit block) where the pattern C and the pattern D are perfectly superposed on top of one another has a high density as a whole.

Figure 12A:
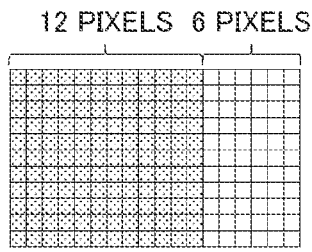
FIG. 12A shows an example of a pattern C that constitutes a first correction pattern.
Figure 12B:
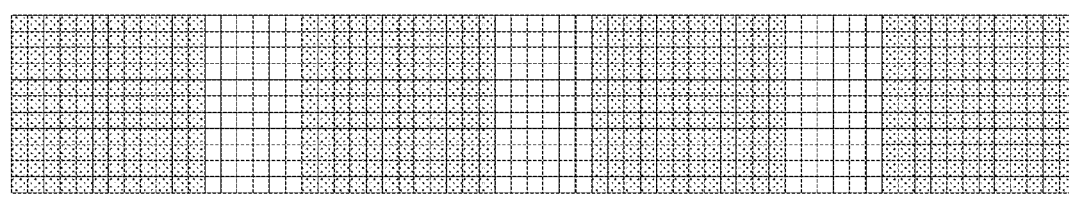
FIG. 12B shows an example of a block C printed by repeating the pattern C shown in FIG. 12A.
Figure 13A:
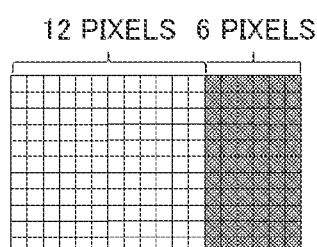
FIG. 13A shows an example of a pattern D that constitutes the first correction pattern.
Figure 13B:
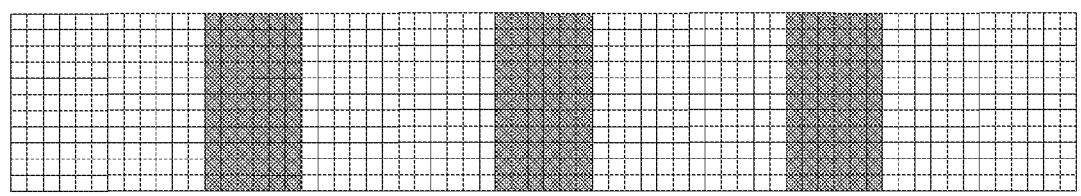
FIG. 13B shows an example of a block D printed by repeating the pattern D shown in FIG. 13A.

FIG. 12B shows the block C printed by repeating the pattern C four times, and FIG. 13B shows the block D printed by repeating the pattern D three times.

In FIG. 12B and FIG. 13B, the pattern C and the pattern D are each painted at regular intervals such that the painted part of the pattern D is perfectly superposed on the unpainted part of the pattern C. In actual printing, while the pattern D is repeated to print blocks D, the painting start position (pixel) in each block D is shifted (i.e., made to differ in position) two pixels.

The second correction chart is formed by repeating the pattern B to print blocks B with the painting start position in each block B being shifted one pixel, whereas the first correction chart is formed by repeating the pattern D to print blocks D with the painting start position in each block D being shifted two pixels, so that the amount of positional difference obtained from the first correction chart is in units of two pixels. Hence, the accuracy of the correction value obtained from the first correction chart is half the accuracy of the correction value obtained from the second correction chart, which is a high-resolution correction chart.

Meanwhile, a printing length required for the detection of the amount of positional difference in units of two pixels within ±6 pixels is about 26 mm (0.0423 mm×(12 (pixels)×4 (times)+6 (pixels)×3 (times)) mm×7 unit blocks+1 mm×6 spaces).

Hence, the printable area having a dimension (e.g., width) of 30 mm makes it possible to obtain correction values corresponding to the amount of positional difference of ±6 pixels.

Returning to FIG. 7, when the correction sheet P is set, the controller 11 first causes the print head 41 of the printing mechanism 4 to print the first correction chart in the first correction value obtaining area Ar1 (Step S2). The controller 11 then causes the camera 51 to image the printed first correction chart, and causes the display 22 or the like to display the image (Step S3).

The controller 11 obtains a correction value corresponding to the darkest part read from the first correction chart itself or from the image displayed by the display 22 or the like (Step S4).

Figure 14A:
FIG. 14A shows examples of part of the block C printed by repeating the pattern C and examples of part of the block D printed by repeating the pattern D.
Figure 14B:
FIG. 14B illustrates correspondence between the first correction chart and a first correction value obtained from the first correction chart.

For example, FIGS. 14A and 14B show examples of correction values (first correction value) readable from the printed first correction chart, which can handle the amount of positional difference of ±6 pixels. The relationship between the printed patterns and the amount of positional difference in FIG. 14B is the same as that in FIG. 11A except that the painting start position is shifted in units of not one but two pixels. Hence, FIG. 14B shows only some of the printed patterns associated with the amount of positional difference.

For example, if the amount of positional difference is 4 pixels (4 pixels to left in FIG. 14B) or 6 pixels (6 pixels to left in FIG. 14B), the darkest part can be recognized.

That is, if the amount of positional difference is 4 pixels to left, the correction value corresponding to the highest density part is "+4" (pixels), and if the amount of positional difference is 6 pixels to left, the correction value corresponding to the highest density part is "+6" (pixels). Thus, in these cases, one (accurate) correction value can be obtained.

Then, the controller 11 sets the correction value obtained based on the first correction chart as the first correction value (Step S5).

The controller 11 also sets, for the second correction chart, a printing position in the second correction value obtaining area Ar2 of the correction sheet P based on this first correction value (Step S6). More specifically, if the second correction chart made up of seven unit blocks, such as the one shown in FIG. 11B, is to be printed, the controller 11 adjusts printing positions of the unit blocks of the second correction chart such that the part corresponding to the amount of positional difference that corresponds to the first correction value (i.e., unit block corresponding to the first correction value or the highest density part of the first correction chart) is arranged at the center, which is the position for the part the correction value of which is "0", as the center block among the seven unit blocks.

Figure 15:
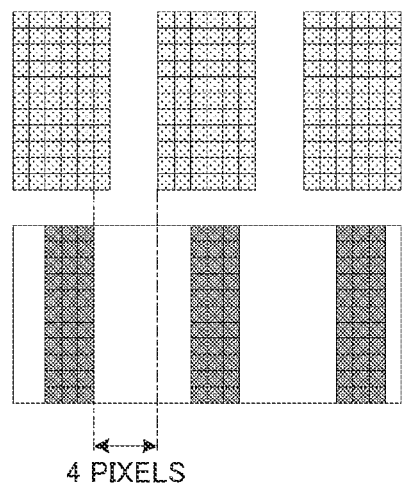
FIG. 15 shows an example of the second correction chart in a case where the first correction value is "−4", showing, at the upper part, an example of the pattern A, which constitutes the second correction chart, printed by first printing, and showing, at the lower part, an example of the pattern B, which constitutes the second correction chart, printed by second printing.

FIG. 15 shows an example of the printed second correction chart in a case where "−4" (pixels) is obtained as the first correction value. FIG. 15 shows only (part of) the block (center block) arranged at the center among the seven unit blocks of the second correction chart.

If the first correction value is "−4" (pixels), the controller 11 performs positional adjustment, as shown in FIG. 15, such that the block where the patterns A, B are perfectly superposed with the painted part of the pattern B shifted four pixels leftward from its original position becomes the center block of the second correction chart, and then causes the print head 41 to print the second correction chart. That is, the unit block with the amount of positional difference of "−4" (pixels) corrected is printed as the center block of the second correction chart.

If the amount of positional difference is 5 pixels (5 pixels to left in FIG. 14B), two dark parts having the same level of density are present, and two correction values of "+4" (pixels) and "+6" (pixels) corresponding thereto are obtained. That is, as shown in FIG. 14B, the part corresponding to a correction value of "+4" has a small gap on the right side of each pattern D, whereas the part corresponding to a correction value of "+6" has a small gap on the left side of each pattern D. The degrees of these gaps are very similar if not the same. Hence, it is difficult to determine whether the correction value in this case should be "+4", "+6", or something in between, such as "+5".

In this case, the second correction chart is printed as follows: the pattern A is printed first, and the pattern B is printed with the painting start position corresponding to either one of "+4" (pixels) and "+6" (pixels), which are the correction values corresponding to the two dark parts between which a darker one cannot be identified, so as to be superposed on the pattern A and arranged at the position of the center block of the second correction chart. Which one of "+4" (pixels) and "+6" (pixels) is set as the second correction value may be automatically determined by the controller 11, or may be input by the user through the operation unit 21 or the like.

After setting the printing position in the second correction value obtaining area Ar2 of the correction sheet P as described above, the controller 11 causes the print head 41 to print the second correction chart at the set printing position (Step S7).

Since the first correction chart is a correction chart in units of two pixels, the accuracy of the correction value obtained therefrom is not high as described above. However, the first correction chart makes it possible to get a rough idea of the amount of positional difference (or correction value) even if the printable area of a printing device is small. Then, positional adjustment is performed such that the unit block having the highest density in the first correction chart is arranged at the position of the center block of the second correction chart, and then the high-resolution correction chart in units of one pixel (second correction chart) is printed, so that a true amount of positional difference (true correction value), which cannot be determined from the first correction chart, can be obtained.

FIG. 16 shows an example of the correction sheet P where the first correction chart and the second correction chart are printed in the first correction value obtaining area Ar1 and the second correction value obtaining area Ar2, respectively.

By printing the first correction chart, the first correction value in units of two pixels (−6, −4, −2, 0, +2, +4 or +6) is obtained. For example, if the darkest part of the first correction chart is the unit block indicating "+4", the first correction value is "+4".

Then, positional adjustment is performed such that the unit block corresponding to the first correction value "+4" is arranged at the position of the center block of the second correction chart, and then the second correction chart is printed.

After the second correction chart is printed, the controller 11 causes the camera 51 to image the second correction chart, and causes the display 22 or the like to display the image (Step S8).

The controller 11 obtains a correction value corresponding to the darkest part read automatically from the second correction chart itself or from the image displayed by the display 22 or the like or read by the user looking at the second correction chart itself or the image (Step S9).

As described above, by printing the second correction chart, the second correction value in units of one pixel is obtained. For example, if positional adjustment is performed such that the unit block corresponding to the first correction value "+4" is arranged at the position of the center block of the second correction chart, and then the second correction chart is printed, a more exact amount of positional difference around the correction value "+4" can be obtained from the second correction chart. For example, if, as a result of examination on the second correction chart about the amount of positional difference of, for example, "+1", "+2", "+3", "+4", "+5", "+6" and "+7", the amount of positional difference determined as "+4" from the first correction chart is actually "+5", the controller 11 sets this correction value "+5" as the second correction value (Step S10), and corrects print data based on this second correction value (Step S11).

Thus, first, the rough first correction chart, which can handle a wide range of the amount of positional difference, is printed to get a rough idea of the amount of positional difference (or correction value) and narrow down the degree and the direction of positional difference, and a range of unit blocks to be printed in the second correction chart, the unit blocks being associated with values of the amount of positional difference, is narrowed down such that the darkest part of the first correction chart is arranged at the position of the center block of the second correction chart, and then the high-resolution second correction chart is printed. As a result, as shown in FIG. 16, in the second correction chart (shown in the lower row in FIG. 16), the unit block having the highest density is arranged closer to the center than in the first correction chart (shown in the upper row in FIG. 16), and the degree of positional difference difficult to be determined accurately in units of two pixels can be determined accurately, and a true amount of positional difference (true correction value) can be obtained accordingly.

This makes it possible to handle a wide range of the amount of positional difference and obtain a high-accuracy correction value even if the printable area of the print head 41 is small.

As described above, according to this embodiment, the print data correction method includes: with the print head 41 that performs printing at least on the correction sheet P as a correction value obtaining medium, printing the first correction chart in the first correction value obtaining area Ar1 of the correction sheet P; setting the correction value obtained based on the printed first correction chart as the first correction value; with the print head 41, printing the second correction chart at the printing position in the second correction value obtaining area Ar2 of the correction sheet P, the printing position being set in accordance with the first correction value; setting the correction value obtained based on the printed second correction chart as the second correction value; and correcting, based on the second correction value, print data to be printed by the print head 41.

This makes it possible to print both the rough first correction chart, which can handle a wide range of the amount of positional difference, and the high-resolution second correction chart the area of which is equal to or smaller than 30 mm×30 mm, which is the same as the printable area of the printing device 1 that performs nail printing.

Then, first, from the first correction chart, a rough idea of the amount of positional difference is gotten, and based on the first correction value obtained from the first correction chart, the second correction chart, from which a higher-accuracy correction value can be obtained, is printed to obtain a high-accuracy correction value, so that print data can be corrected with high accuracy.

This makes it possible to handle a wide range of the amount of positional difference and obtain a correction value having sufficient accuracy to correct print data even if the printable area of the print head 41 is small.

Further, in this embodiment, the first correction value obtaining area Ar1 and the second correction value obtaining area Ar2 are provided in one correction sheet P.

This eliminates the necessity to replace a correction sheet P by another after printing the first correction chart. In addition, since the first correction chart and the second correction chart are printed on one sheet of paper, maintenance costs of the printing device 1 borne by the user can be reduced.

Further, in this embodiment, the second correction chart is a higher-resolution correction chart than the first correction chart.

This makes it possible to obtain the second correction value, which is a high-accuracy correction value, based on the second correction chart, and correct print data with high accuracy.

Further, in this embodiment, the first correction value and the second correction value are obtained based on the high density part of the first correction chart and the high density part of the second correction chart printed by the print head 41, respectively.

This enables the controller 11 to automatically obtain a correction value by analyzing an image obtained by imaging a correction chart, or obtain same from the user or someone else who looks at a correction sheet P itself where a correction chart has been printed or an image obtained by imaging the correction sheet P.

Further, in this embodiment, the print head 41 employs the multi-pass method, thereby performing printing on an area by a plurality of passes from the first pass to the nth pass, and includes a plurality of nozzles from the first nozzle(s) to the nth nozzle(s) that are in charge of printing during the first pass to printing during the nth pass, respectively, and the first correction chart and the second correction chart are each formed by the first printing, which is printing during the first pass with the first nozzle(s), and the second printing, which is printing during the nth pass with the nth nozzle(s).

By employing the multi-pass method, even if some of the nozzles of the print head 41 are defective, they can be supplemented by the other nozzles, so that high-quality printing results can be obtained.

In such multi-pass printing, if the print head 41 is inclined, printing during the first pass on an area and printing during the nth pass, which is the last pass, on the area differ in position from one another the largest. In this regard, in this embodiment, each correction chart is formed by the first printing, which is printing during the first pass with the first nozzles, and the second printing, which is printing during the nth pass with the nth nozzles. This makes it possible to catch the state having the largest amount of positional difference accurately and obtain an accurate correction value.

Further, in this embodiment, the first correction chart and the second correction chart are each formed by the first printing and the second printing that print patterns that complement one another.

This makes it easy to recognize whether the first printing and the second printing differ in position from one another, and if so, makes it easy to determine a correction value or the like.

Further, the first correction value and the second correction value are obtained based on an image(s) of the first correction chart and the second correction chart printed by the print head 41.

This enables the controller 11 to automatically detect the darkest part or the like of a correction chart and obtain a correction value by processing an image obtained by imaging the correction chart.

Although one or more embodiments of the present disclosure have been described above, it goes without saying that the present disclosure is not limited to the embodiments, and can be modified in a variety of respects without departing from its scope.

For example, in the above embodiment, at least the first correction value obtaining area (Ar1 in FIG. 3) and the second correction value obtaining area (Ar2 in FIG. 3) are provided in one correction sheet P as a correction value obtaining medium. However, the correction value obtaining medium is not limited thereto.

For example, the first correction value obtaining area Ar1 and the second correction value obtaining area Ar2 may be provided in separate correction sheets P (correction value obtaining media).

In this case, after the first correction chart is printed on the correction sheet P having the first correction value obtaining area Ar1 and the first correction value is obtained, the second correction chart is printed at the printing position set in the correction sheet P having the second correction value obtaining area Ar2, the printing position being set in accordance with the first correction value.

Thus, providing the first correction value obtaining area Ar1 and the second correction value obtaining area Ar2 in separate correction sheets P (correction value obtaining media) makes it possible to print the first correction chart and the second correction chart in larger areas for wider ranges of the amount of positional difference.

Further, in the above embodiment, a correction value is obtained based on the highest density part of a correction chart, but the method for obtaining a correction value(s) is not limited thereto.

For example, as two printing patterns for correction to print unit blocks of a correction chart, straight lines having a width of about one to two pixels in the main-scanning direction and extending in the sub-scanning direction may be printed at predetermined intervals, and a correction value may be obtained based on a part (unit block) where a design is most clearly visible by the straight lines of the printing patterns being superposed, i.e., the part having the highest sharpness.

If the print head 41 is inclined, image sharpness decrease. That is, if the contour or the like of an image that is supposed to be clearly read is blurred or fuzzy, it can be determined that positional difference in printing occurs. This also enables the controller 11 to automatically obtain a correction value by analyzing an image obtained by imaging a correction chart, or obtain same from the user or someone else who looks at a correction sheet P itself where a correction chart has been printed or an image obtained by imaging the correction sheet P. The printing patterns for correction to print unit blocks do not need to be the straight-line patterns either. The printing patterns may be grid-like patterns. In this case too, a correction value may be obtained based a part (unit block) where a design is most clearly visible by the grad-like patterns being superposed, i.e., the part having the highest sharpness.

Further, in the above embodiment, after the first correction chart is printed to obtain the first correction value, the second correction chart is printed in the second correction value obtaining area Ar2 such that the part where the patterns A, B are perfectly or, if not, closest to perfectly, superposed (i.e., part having the least amount of gaps therein) based on the obtained first correction value is arranged at the center, but instead the second correction chart may be printed therein such that only the unit block corresponding to the first correction value and unit blocks corresponding to correction values before and after the first correction value are printed. That is, after the first correction value is obtained, the second correction chart may be formed in the second correction value obtaining area Ar2 by printing using the first correction value, printing using the "first correction value−1" and printing using the "first correction value+1".

Figure 17:
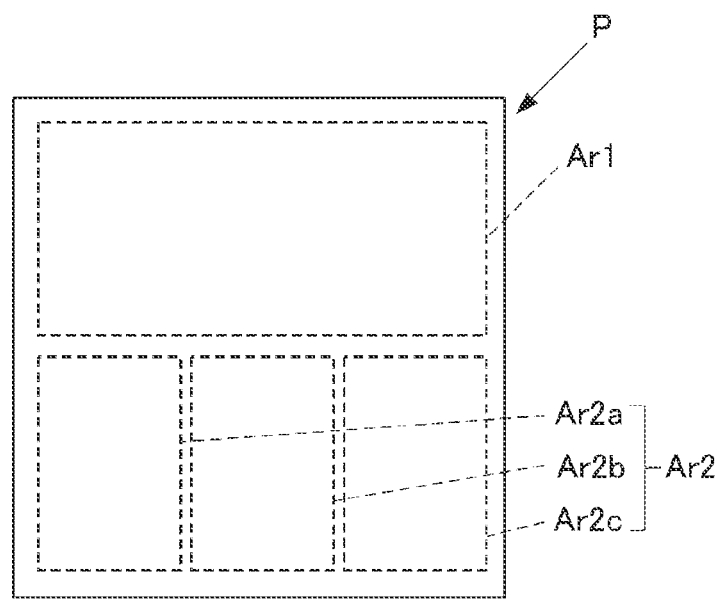
FIG. 17 is a plan view of an example of the correction sheet provided with a first correction value obtaining area and a second correction value obtaining area according to a modification of the embodiment.

In this case, for example, as shown in FIG. 17, the first correction value obtaining area Ar1 and the second correction value obtaining area Ar2 having a first frame Ar2a, a second frame Ar2b and a third frame Ar2c are respectively provided in the upper row and the lower row in a correction sheet P, and the first correction chart is printed in the first correction value obtaining area Ar1, and the printing patterns of the second correction chart are printed using the "first correction value−1" in the first frame Ar2a of the second correction value obtaining area Ar2, printed using the first correction value in the second frame Ar2b thereof, and printed using the "first correction value+1" in the third frame Ar2c thereof. Then, among the unit blocks printed in the first frame Ar2a, the second frame Ar2b and the third frame Ar2c, the unit block having the highest density is determined, and the correction value used for the unit block having the highest density is obtained as the second correction value.

Further, in the above embodiment, a true amount of positional difference (true correction value) is obtained by taking two steps, namely, a step of printing the first correction chart to obtain the first correction value and a step of printing the second correction chart at the printing position set in accordance with the first correction value to obtain the second correction value. However, the number of steps taken for obtaining a true amount of positional difference (true correction value) is not limited to two.

For example, a true amount of positional difference (true correction value) may be obtained by narrowing down true-correction-value candidates by taking three steps or more.

Further, in the above embodiment, the range of unit blocks, which are associated with values of the amount of positional difference, to be printed in the second correction chart is narrowed down such that the darkest part of the first correction chart is arranged at the position of the center block of the second correction chart, but the factor used for narrowing down the range of unit blocks to be printed therein is not limited to "density".

For example, it may be brightness. Further, if the pattern A is printed in black and the pattern B is printed in another color, such as C, M or Y, the correction value may be determined based on saturation or the like.

Further, in the above embodiment, the first correction chart is a chart for obtaining a rough-accuracy correction value, and the second correction chart is a chart for obtaining a high-accuracy correction value. However, if a method of getting a rough idea of the amount of positional difference (or correction value) from the first correction chart and gradually narrowing down the range to examine is used, the second correction chart may not be a chart for obtaining a high-accuracy correction value.

Further, in the above embodiment, the correction value obtaining areas (first correction value obtaining area Ar1, second correction value obtaining area Ar2, etc.) are preset in a correction sheet P as a correction value obtaining medium. However, as far as the positions where printing for obtaining the correction values has been performed can be recognized, it is not essential that the correction value obtaining areas are preset in a correction value obtaining medium.

Further, the correction value obtaining medium where the first correction chart, the second correction chart and/or the like are to be printed is not limited to a correction sheet(s) P. For example, a nail or the like may be used as the correction value obtaining medium.

Further, in the above embodiment, the printing device 1 cooperates with the terminal device 8, thereby constituting a printing system, and, for example, a nail design is selected with the terminal device 8, and printing is performed by the printing device 1. However, the printing device 1 is not limited thereto.

For example, the user may make various operations through the operation unit 21 or the display 22 of the printing device 1, and the control unit 10 of the printing device 1 may perform various processes in accordance with these operations. In this case, the printing device 1 may complete printing by itself without cooperating with the terminal device 8. Further, the degree of cooperation (degree of process sharing) of the printing device 1 and the terminal device 8 may be changed from that in the above embodiment. For example, the terminal device 8 may be in charge of most processes except for imaging and printing.

Further, various data, such as nail designs, captured nail images and shape information on nails, may be stored in the storage 82 of the terminal device 8 or the storage 12 of the printing device 1.

Alternatively or additionally, various data may be stored in a server device or the like to which the terminal device 8 or the printing device 1 is connectable via a network line or the like, and the terminal device 8 or the printing device 1 may be configured to refer to the data by accessing the server device or the like. This makes it possible to select a nail design to be printed from a larger number of nail designs.

Although one or more embodiments of the present disclosure have been described above, the scope of the present disclosure is not limited to the embodiments described above, but includes the scope of the present disclosure stated in claims and its equivalents.

The invention claimed is:

1. A print data correction method that is executed by a printing device, comprising:
    printing a first correction chart with a printer that performs printing;
    obtaining a first correction value based on the printed first correction chart;
    printing a second correction chart based on the first correction value with the printer;
    obtaining a second correction value based on the printed second correction chart; and
    correcting, based on the second correction value, print data to be printed by the printer.

2. The print data correction method according to claim 1, wherein a unit block corresponding to the first correction value is printed by the printer at a center of the second correction chart.

3. The print data correction method according to claim 2, wherein the second correction chart is printed such that a highest density part of the first correction chart, the highest density part being a part corresponding to an amount of positional difference corresponding to the first correction value, is at the center of the second correction chart as a center block, the second correction chart being a higher-resolution correction chart than the first correction chart.

4. The print data correction method according to claim 1, wherein the first correction chart and the second correction chart are printed on one correction value obtaining medium or separate correction value obtaining media.

5. The print data correction method according to claim 1, wherein the second correction chart is a higher-resolution correction chart than the first correction chart.

6. The print data correction method according to claim 1,
    wherein the first correction value is obtained based on a highest density or sharpness part of the printed first correction chart, and
    wherein the second correction value is obtained based on a highest density or sharpness part of the printed second correction chart.

7. The print data correction method according to claim 1,
    wherein the printer performs printing on an area by a plurality of passes from a first pass to an nth pass, and includes a plurality of nozzles from a first nozzle to an nth nozzle that are in charge of printing during the first pass to printing during the nth pass, respectively, and
    wherein the first correction chart and the second correction chart are each formed by first printing that is the printing during the first pass with the first nozzle and second printing that is the printing during the nth pass with the nth nozzle.

8. The print data correction method according to claim 7, the first correction chart and the second correction chart are each formed by the first printing and the second printing that print patterns that complement one another.

9. The print data correction method according to claim 1, wherein the first correction value and the second correction value are obtained based on an image of the first correction chart and the second correction chart printed by the printer.

10. A non-transitory computer-readable storage medium storing a program to cause a computer of a printing device including a printer that performs printing on a correction value obtaining medium to:
    cause the printer to print a first correction chart;
    obtain a first correction value based on the printed first correction chart;
    cause the printer to print a second correction chart based on the first correction value;
    obtain a second correction value based on the printed second correction chart; and
    correct, based on the second correction value, print data to be printed by the printer.

* * * * *